Patented Aug. 18, 1942

2,293,602

UNITED STATES PATENT OFFICE 2,293,602

SOLDER

Edward J. Ferguson, Norwood, Pa., assignor to North American Smelting Company, Philadelphia, Pa., a corporation of Pennsylvania No Drawing. Application March 5, 1942, Serial No. 433,447

3 Claims. (Cl. 75—166)

The invention relates to solder.

A purpose of the invention is to obtain greater fluid crawling in solder.

A further purpose is to improve sweat fitting solder by increasing the tendency of a sweat fitting solder to crawl.

A further purpose is to produce a solder having a greater hot strength and therefore useful in installations which operate at high temperatures.

A further purpose is to increase the tinning action of solder made without tin.

A further purpose is to secure greater corrosion resistance in a solder.

A further purpose is to make a solder of wide utility without employing the strategic metal tin.

A further purpose is to make a lead base solder containing from 1.5 to 3 percent and preferably about 2 percent of silver, and from 0.5 to 5 percent and preferably about 1 percent of antimony.

Further purposes appear in the specification and in the claims.

The usual prior art low melting solder has been an alloy of lead and tin in varying proportions. It has generally been supposed that this alloy has the best soldering properties in the low melting range.

The solder of the present invention has been found after extensive test to possess several distinct advantages over the usual lead-tin solders.

The solder of the present invention crawls much better in fluid state than lead-tin solders on many types of work. This matter of crawling, while probably related to tinning effect, is a somewhat different manifestation. It is important in getting solder penetration into interstices and narrow crevices between surfaces to be soldered.

The improved fluid crawling of the solder of the invention makes it very suitable for a sweat fitting solder, for use in making sweated joints. As a sweat fitting solder the product of the invention is superior to the usual lead-tin sweat fitting solders. This superiority is apparent in sweating steel fittings, but is particularly pronounced when applied to fittings of copper, brass or bronze.

The property of improved fluid crawling is unpredictable. It is not necessarily associated with low viscosity or high fluidity as one might assume.

One of the very advantageous features of the solder of the invention is that it has a higher strength at elevated temperatures than lead-tin solders. This permits use in equipment normally subjected to temperatures above room temperature and up to about 275° C. This is above the melting point of the usual lead-tin solders.

An important feature of the new solder is that it has a rather good tinning effect without necessarily including any tin. By tinning effect, it is meant to describe the wetting action for the metallic surfaces being soldered. The tinning effect of the new solder is pronounced when soldering tin plate such as roofing tin, is nevertheless marked when soldering copper, brass or bronze, and is less outstanding when soldering galvanized iron. The solder of the invention may also be used on steel, iron, zinc, etc. where a lead-tin solder would be used.

Much solder is employed in places where corrosion is likely to be encountered. In the case of food cans corrosion involves a health problem. The present solder is more resistant to atmospheric corrosion than lead-tin solders.

At the present time, shortage of tin makes it very desirable to avoid tin in solder. The solder of the invention can be produced very satisfactorily without tin.

The solder of the invention is a lead base alloy containing silver and antimony.

The lead provides the matrix, and all of the alloy aside from the other ingredients mentioned, will be substantially lead plus impurities.

The range of silver content is quite important. There should be between 1.5 and 3 percent of silver, preferably between 1.7 and 2.5 of silver, and most desirably about 2 percent of silver. Below 1.5 percent of silver the alloy is inoperative as a solder because it will not tin steel, sheet iron, and the like. From 1.5 percent to 2 percent of silver, the tinning effect increases markedly with silver content. Above about 2 percent of silver, tinning effect does not increase so markedly with increase of silver up to 3 percent.

Increase in silver content above 1.5 percent lowers the melting point up to 2.5 percent of silver, and further increase in silver content up to 3 percent raises the melting point. Between 2 percent and 2.5 percent of silver, the lowering of melting point with increase of silver is so slight that there is little advantage in adding silver for that reason alone. The economic factor would of course favor limiting the silver to 2 percent.

Increase in silver content above 1.5 percent and up to 3 percent increases the strength at room temperature, the hardness, and the ductility of the solder. Above 2 percent the increase is not quite so pronounced. Also, the corrosion resistance increases with increase of silver from 1.5 to 3 percent.

The practical upper limit of the silver is 3 percent because above that point increase in silver markedly increases the melting point and does not aid the physical properties.

The antimony should range between 0.5 and 5 percent, preferably between 1 and 3 percent and most desirably about 1 percent.

As already explained, only a certain amount of lowering of melting point can be obtained with silver because above 2.5 percent, silver tends to increase the melting point. Antimony above 0.5 percent and up to 5 percent lowers the melting point beyond the amount which it is lowered by the silver.

Antimony above 0.5 percent and up to 5 percent increases the fluid crawling property of a lead-silver solder of the composition under discussion. This is remarkable as antimony does not seem to do this by lowering the surface tension and does not increase the tinning effect; it appears to act in some other way which is still imperfectly understood.

The effect in increasing the fluid crawling is very pronounced at about 1 percent of antimony and does not increase very sharply with increase of antimony above 1 percent. However, 0.5 percent is not sufficient antimony to develop this property to the fullest extent.

Increase in antimony from 0.5 to 5 percent increases the tensile strength without very serious loss in ductility. It is not practical to use more than 5 percent of antimony in the solder of the invention because of embrittlement. It is best to limit the antimony to 3 percent in order to preserve the best ductility.

Certain alloying elements may be optionally included.

The melting point of the present solder is about 100° C. higher than the 50 percent lead-tin solder. Accordingly, care must be taken to employ a higher temperature in soldering.

The tensile strength of the solder of the invention is from about 4700 to 5700 pounds per square inch, which is at least as good as that of lead-tin solders whose tensile strengths range from about 4000 to 5000 pounds per square inch. A solder consisting of 2 percent of silver, 1 percent of antimony and the balance lead, gave a tensile strength of 4760 pounds per square inch, and a similar solder with the antimony content increased to 3 percent gave a tensile strength of 5780 pounds per square inch.

In the solder of the invention, each percent of antimony increases the tensile strength considerably more than each percent of silver.

The solder of the invention has a ductility at least as good as the 50 percent lead-tin solder.

Silver antimony solders in accordance with the invention are:

| Example | Lead and impurities | Silver | Antimony |
|---|---|---|---|
| | | Percent | Percent |
| 1 | Balance | 1.5 to 3 | 0.5 to 5 |
| 2 | do | 1.7 to 2.5 | 1 to 3 |
| 3 | do | 2 | 1 |
| 4 | do | 2.5 | 1.3 |
| 5 | do | 2.2 | 3 |

In using the solder of the invention, ordinary soldering technique may be used.

For steel, the best fluxes are completely killed hydrochloric (muriatic) acid or a 20 percent water solution of zinc chloride. For tin plate, best results are secured with rosin-tallow flux or the paste type consisting of tallow and zinc chloride. For galvanized iron, hydrochloric (muriatic) acid killed with zinc and then made acid with hydrochloric (muriatic) acid, or a 10 percent solution of zinc chloride in 20 percent hydrochloric (muriatic) acid, are best. For copper, brass, or zinc, the paste type fluxes above referred to are best.

All joints should of course be clean.

If the precautions mentioned are followed, the results achieved with the solder of the present invention will be at least as good as those obtained with lead-tin solders of the prior art.

In view of my invention and disclosure variations and modifications to meet individual whim or particular need will doubtless become evident to others skilled in the art, to obtain all or part of the benefits of my invention without copying the alloy shown, and I, therefore, claim all such in so far as they fall within the reasonable spirit and scope of my invention.

Having thus described my invention what I claim as new and desire to secure by Letters Patent is:

1. A lead base solder consisting of from 1.5 to 3 percent of silver, from 0.5 to 5 percent of antimony and the balance substantially lead and impurities.

2. A lead base solder consisting of from 1.7 to 2.5 percent of silver, from 1 to 3 percent of antimony and the balance substantially lead and impurities.

3. A lead base solder consisting of about 2 percent of silver, about 1 percent of antimony, and the balance substantially lead and impurities.

EDWARD J. FERGUSON.